Sept. 1, 1959
F. J. RODIN
2,902,148
POTATO HARVESTER
Filed May 21, 1954
4 Sheets-Sheet 3
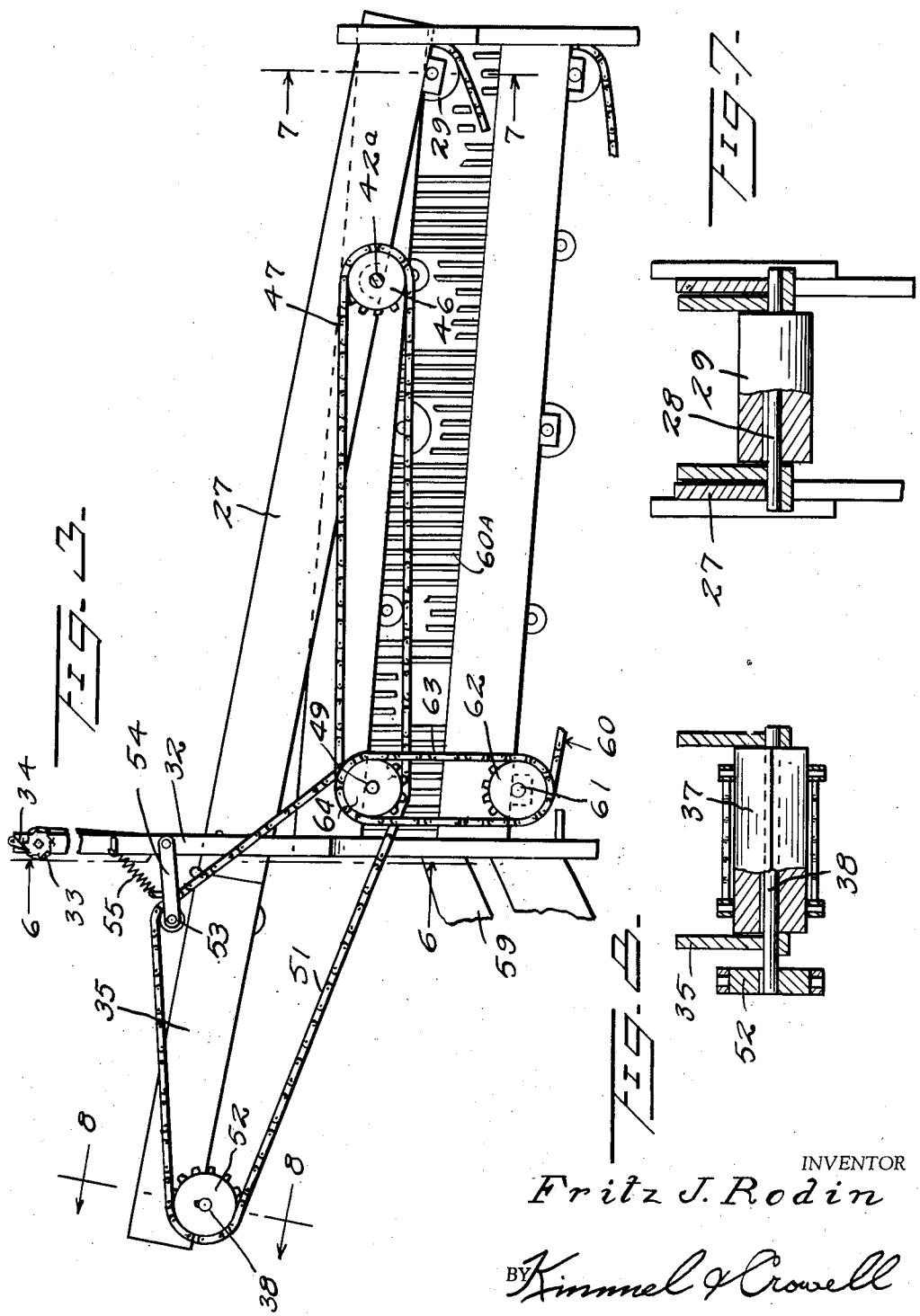
INVENTOR
*Fritz J. Rodin*
BY *Kimmel & Crowell*
ATTORNEYS Sept. 1, 1959 F. J. RODIN 2,902,148
POTATO HARVESTER
Filed May 21, 1954 4 Sheets-Sheet 4
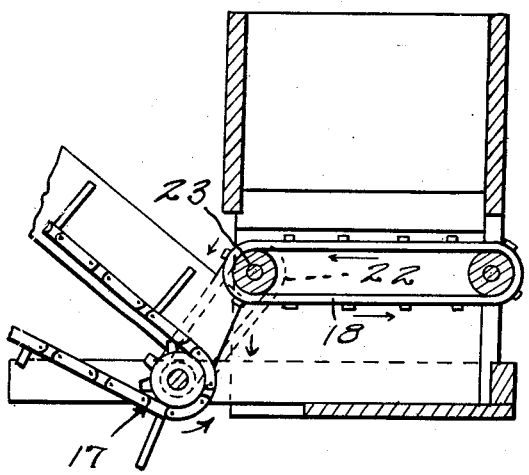
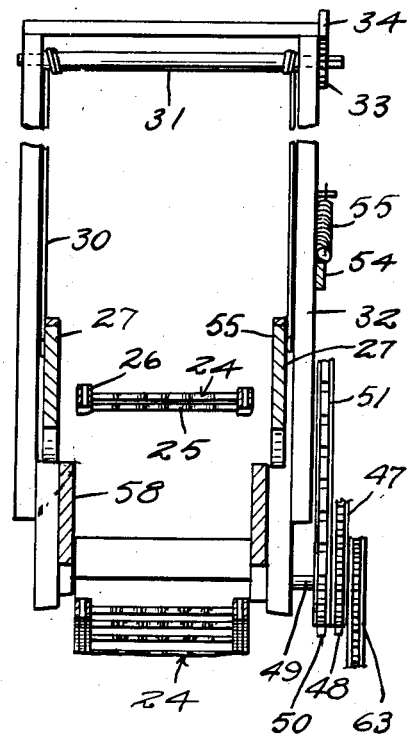
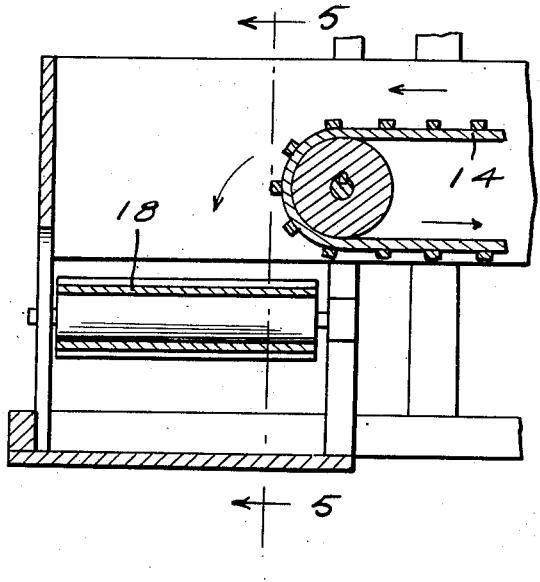
INVENTOR
*Fritz J. Rodin*
BY *Kimmel & Crowell*
ATTORNEYS 2,902,148
POTATO HARVESTER Fritz J. Rodin, Chatham Center, N.Y.

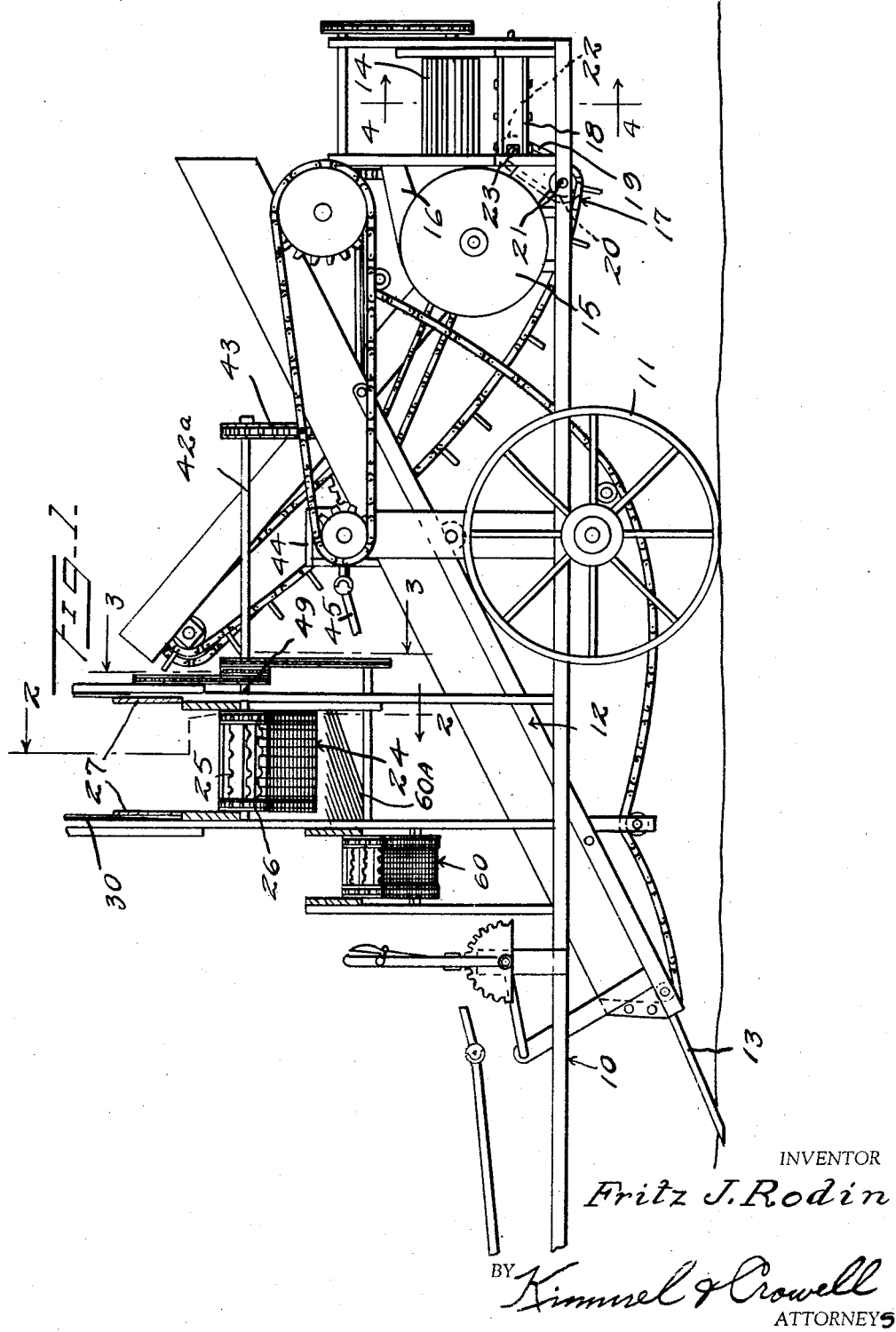

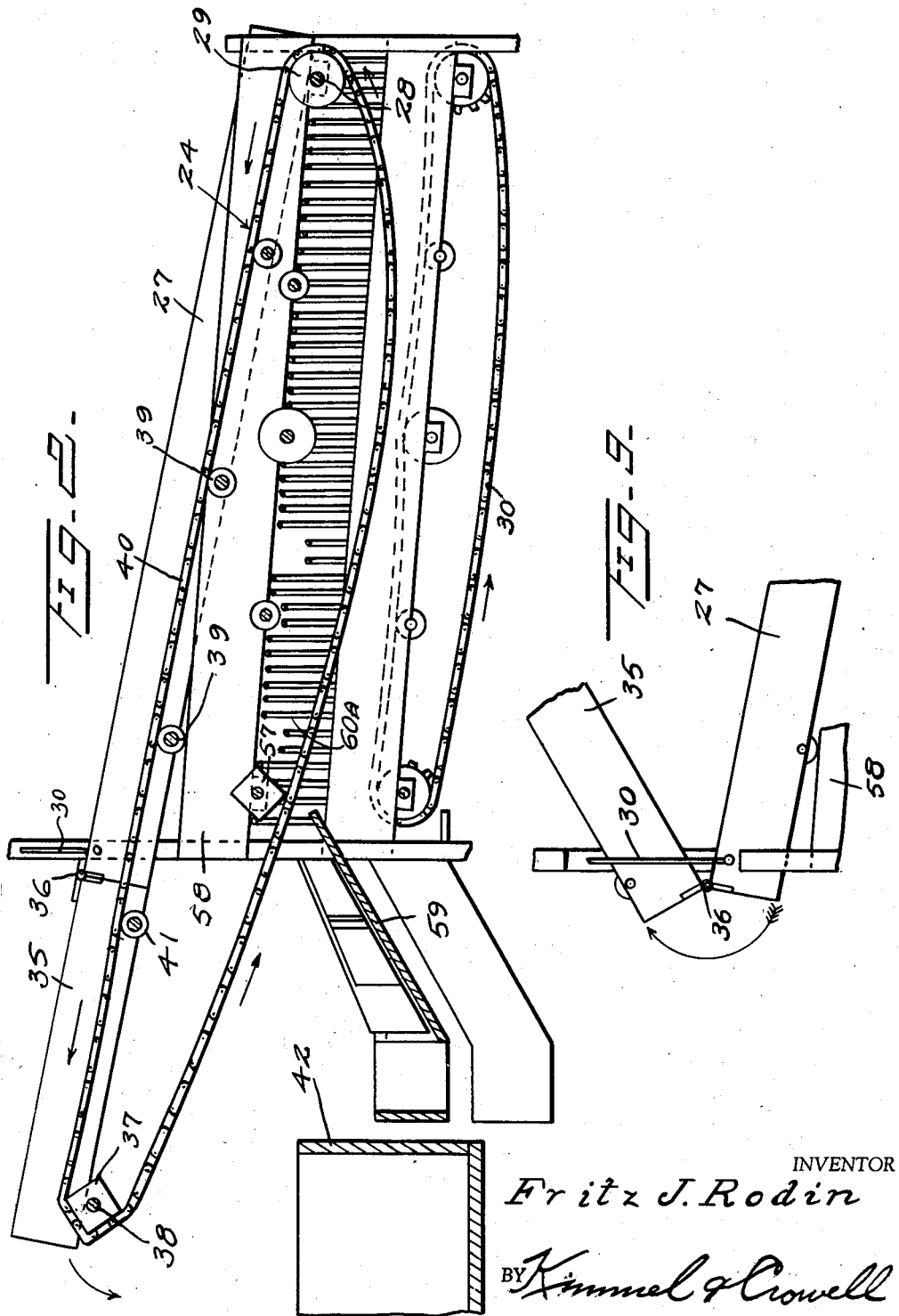

Application May 21, 1954, Serial No. 431,381

1 Claim. (Cl. 209—34)

This invention relates to potato digging and harvesting machines, and is an improvement over the construction embodied in my copending application Patent No. 2,693,068, issued November 2, 1954 for a Potato Digging and Separating Machine.

An object of this invention is to provide in a potato digging and harvesting machine an improved grading means embodying a chain grader and a polygonal driving drum so that in the event the chain should stick the driving drum may turn within the chain without breaking or injuring the chain.

Another object of this invention is to provide an extensible grader so that the larger potatoes may be discharged into the body of a truck disposed beside the machine.

A further object of this invention is to provide in a machine of this type a short longitudinal conveyor adapted to receive the potatoes from the rear cross conveyor and to discharge the potatoes onto the lower end of the elevator.

With the above and other objects in view, my invention consists in the arrangement, combination and details of construction disclosed in the drawings and specification, and then more particularly pointed out in the appended claim.

In the drawings:

Figure 1 is a detail side elevation, partly broken away and in section, of a potato harvester constructed according to an embodiment of this invention.

Figure 2 is an enlarged fragmentary sectional view taken on the line 2—2 of Figure 1.

Figure 3 is an enlarged fragmentary sectional view taken on the line 3—3 of Figure 1.

Figure 4 is an enlarged fragmentary sectional view taken on the line 4—4 of Figure 1.

Figure 5 is a fragmentary sectional view taken on the line 5—5 of Figure 4.

Figure 6 is a fragmentary sectional view taken on the line 6—6 of Figure 3.

Figure 7 is a fragmentary sectional view taken on the line 7—7 of Figure 3.

Figure 8 is a sectional view taken on the line 8—8 of Figure 3.

Figure 9 is a fragmentary side elevation showing the extension grader in partly collapsed position.

Referring to the drawings, the numeral 10 designates generally a frame structure having traction wheels 11. The frame structure 10 has mounted therein an elevator 12 extending upwardly and rearwardly from a digging blade 13.

The elevator 12 is adapted to discharge the potatoes and vines at the rear thereof onto a cross conveyor 14 which is disposed a substantial distance below the upper rear end of the elevator 12.

A blower 15 has the outlet nozzle 16 thereof disposed between the discharge end of the elevator 12 and the cross conveyor 14 so as to blow the loose vines, dirt and other material rearwardly over the cross conveyor 14.

A second elevator 17 is disposed at one side of the machine and is adapted to raise the potatoes upwardly to a grading means, as will be hereinafter described. The elevator 17 has the lower rear end thereof disposed below a short horizontal conveyor 18 which is disposed in a position to receive the potatoes from the cross conveyor 14.

The structure hereinbefore described, with the exception of the short longitudinal conveyor 18, is similar to that embodied in my copending application, supra.

The conveyor 18 is driven by means of an endless chain 19 engaging a sprocket 20 mounted on the lower elevator shaft 21 and the chain 19 engages a sprocket 22 mounted on the forward conveyor shaft 23. The potatoes which are elevated by the elevator 17 are discharged onto an endless grading member generally indicated at 24.

The grading member 24 is formed of a plurality of grading bars 25 secured to side chains 26, and the chains 26 are disposed between a pair of side rails 27.

The rails 27 are rockably mounted at one end thereof on a drum shaft 28 carrying a drum 29 about which the grading member 24 engages. The rails 27, at their opposite ends, are vertically adjustable so that the graded potatoes are raised upwardly, and the rails 27 are vertically adjusted by means of a pair of cables 30 secured at their lower ends to the rails 27 and wound about a shaft 31 which is rotatably carried by a pair of upright supports 32. The shaft 31 has fixed thereto a ratchet 33 with which a pawl 34 engages so that the shaft 31 may be held in an adjusted position.

In order to provide a means whereby the graded potatoes may be discharged laterally of the frame 10 into a truck body, I have provided a pair of extension rails 35 which are hinged as at 36 to the ends of the rails 27.

The grading member 24 engages between the extension rails 35, and the grading member 24 engages about a polygonal drum 37 mounted on a shaft 38. The drum 37 is provided so that the grading member 24 may be moved under normal conditions, but in the event some material may clog up the grading member 24 so as to cause this member to stick, the drum 37 may rotate within the grading member 24 without locking with or driving the grader 24.

The rails 27 have rotatably disposed therebetween a plurality of idler rollers 39 which engage beneath the upper run 40 of the grading member 24. The rails 35 also have disposed therebetween at least one idler roller 41 which engages beneath the upper run 40 of the grading member 24.

When the grading member 24 is operating, the graded potatoes are discharged into the body 42 of a truck which is positioned along side of the frame 10.

The grading member 24 is driven from a drive shaft 42a which is operated from a chain 43 connected through a conventional gearing 44 with a drive shaft 45. The drive shaft 45 extends forwardly and is adapted to be connected to the power take-off of a tractor.

The shaft 42a has fixed thereto a sprocket 46 about which a chain 47 engages and the chain 47 engages about a sprocket 48 mounted on a shaft 49. The shaft 49 also has fixed thereon a sprocket 50 about which a chain 51 engages. The chain 51 extends forwardly and engages about a sprocket 52 which is fixed to the shaft 38.

The chain 51 is relatively loose, as shown in Figure 3, and is held substantially taut by means of an idler sprocket or roller 53 which is rotatably carried by a pivoted arm 54 mounted on an upright 32.

A spring 55 is connected between the arm 54 and the upright 32 so as to yieldably hold the chain 51 substantially taut. By providing the chain tensioning member 53 the chain 51 is sufficiently loose so that when the extension rails 35 are swung upwardly and inwardly to overlie the side rails 27, the chain 51 will freely permit the collapsing of the extension rails 35.

Where the potatoes are to be discharged into bags instead of the truck body 42, the grader 24 is removed and a short grader (not shown) is engaged about the drum 29 and about a square or polygonal drum 57 which is fixed on shaft 49.

The short grader engages between side rails or guard members 58 which are disposed along the longitudinal edges thereof. The short grader discharges the graded potatoes into a chute 59 which is similar to the structure embodied in my copending application.

A second grader 60 is disposed forwardly and below the grader 24 so as to receive the small potatoes which drop through the grader 24 onto downwardly inclined bars 60a extending from under grader 24 to grader 60. The grader 60 is operated from a shaft 61 having a sprocket 62 fixed thereon about which a chain 63 engages. The chain 63 also engages about a sprocket 64 mounted on shaft 49.

In the use and operation of this machine, when the number of potatoes being dug and graded by the machine are in excess of the capacity of the bags to receive these potatoes and the operator to effect quick changing of the full bags for empty bags, the structure including the long grader 24 shown in Figure 2 is used, dumping the potatoes directly in a wagon or truck.

As the potatoes are dug by the blade 13 these potatoes move upwardly in the elevator 12 and are dropped downwardly onto the rear cross conveyor 14. The blower 15 will blow the loose dirt, loose vines, and other material rearwardly of the machine so that the potatoes will be in a relative clean condition when they are discharged onto the short conveyor 18. The potatoes moved forwardly by the conveyor 18 are discharged onto the elevator 17 and these potatoes are then discharged onto the grading member 24.

As the grading member 24, with the extension rails 35, projects laterally beyond the frame 10 the truck body 42 may be moved with the frame 10 so as to receive the potatoes as they are discharged from the grading member 24. The smaller potatoes which are graded by the lower and forward grading member 60 are discharged into bags as set forth in my copending application.

What is claimed is:

In a device of the class described a frame, wheels supporting said frame, a lifting conveyor arranged longitudinally of said frame sloping upwardly and rearwardly therein, a transverse conveyor carried by said frame having one end thereof positioned beneath the upper discharge end of said lifting conveyor, a blower mounted on said frame for directing a stream of air across said transverse conveyor removing trash therefrom, a second lifting conveyor arranged longitudinally of said frame sloping upwardly and forwardly therein in spaced parallel relation to said lifting conveyor and having one end thereof positioned beneath the discharge end of said transverse conveyor, a flexible combined grading member and conveyor carried by said frame in spaced parallel relation to said transverse conveyor with one end thereof positioned beneath the discharge end of said second lifting conveyor, said grading member and conveyor including a pair of elongated side members, a shaft rotatably carried by said frame and extending transversely between said side members, said members being pivoted on said shaft, a drum fixed on said shaft between said side members, a second pair of side members, means hingedly securing the inner ends of said second pair of side members to said first pair of side members, a drum rotatably disposed between the outer ends of said second pair of side members, an endless grading chain engaging about said drums, means carried by said frame including a drum and a cable wound on said drum having its free end connected with said first pair of side members for vertically adjusting the discharge end of said grading member and conveyor by winding of said cable on said drum, and interconnected means on said frame for driving each of said conveyors and said combined grading member and conveyor.

References Cited in the file of this patent
UNITED STATES PATENTS

| | | |
|---|---|---|
| 645,996 | Buchey | Mar. 27, 1900 |
| 1,032,375 | Boggs | July 16, 1912 |
| 1,159,460 | Wright et al. | Nov. 9, 1915 |
| 1,715,218 | Wright et al. | May 28, 1929 |
| 2,139,199 | Morgan | Dec. 6, 1938 |
| 2,209,282 | Rodin | July 23, 1940 |
| 2,373,426 | Spafford | Apr. 10, 1945 |
| 2,388,921 | Kooiker | Nov. 13, 1945 |
| 2,693,068 | Rodin | Nov. 2, 1954 |
| 2,704,605 | Dahlman | Mar. 22, 1955 |
| 2,724,226 | Askviken et al. | Nov. 22, 1955 |